United States Patent [19]

Gates

[11] 4,396,942
[45] Aug. 2, 1983

[54] VIDEO SURVEYS

[76] Inventor: Jackson Gates, P.O. Box 145, Kylertown, Pa. 16847

[21] Appl. No.: 235,117

[22] Filed: Feb. 17, 1981

Related U.S. Application Data

[63] Continuation of Ser. No. 31,559, Apr. 19, 1979, abandoned.

[51] Int. Cl.³ .......................... H04N 7/02; H04N 5/76
[52] U.S. Cl. .................................... 358/107; 358/335; 356/397
[58] Field of Search ............... 358/107, 108, 109, 127, 358/335; 360/33, 10, 35, 19, 33.1, 10.1, 35.1, 19.1; 346/107 R, 107 B, 107 VP; 356/397, 391

[56] References Cited

U.S. PATENT DOCUMENTS

| 2,616,177 | 11/1952 | Bazhaw | 354/109 |
| 2,826,113 | 3/1958 | New | 356/391 |
| 4,041,529 | 8/1977 | Masterfield | 358/109 |
| 4,097,893 | 6/1978 | Camras | 358/127 |

OTHER PUBLICATIONS

Australian Road Research, "Methods of Measuring Variables Along a Highway", by Tindell, vol. 2, No. 9, Sep. 1966, pp. 3–14.

Primary Examiner—Alan Faber
Attorney, Agent, or Firm—Steele, Gould & Fried

[57] ABSTRACT

A method for surveying, comprising the steps of: video recording all locations to be surveyed from a predetermined control position, for subsequent playback on a monitor screen; preparing a transparent overlay having a scale correlating the predetermined control position of the video recording means with respect to the surveyed locations and the size of the screen; applying the overlay to the screen while playing back the video recording, utilizing the overlay to ascertain actual distances; and, annotating maps or the like with the actual distances, interrupting or replaying portions of the video recording as necessary. In lieu of geometrically correlating the control position, the scaled overlay may be prepared on the basis of at least one actual measurement taken during the course of the survey. The method further contemplates the step of dictating and recording notes pertinent to the surveyed locations and circumstances of the survey, simultaneously with the video recording. The video survey may be conducted from a moving vehicle, such as a motor vehicle, airplane or helicopter, and may be made with a video cassette recording apparatus.

10 Claims, 4 Drawing Figures

U.S. Patent  Aug. 2, 1983  4,396,942
FIG. 1.
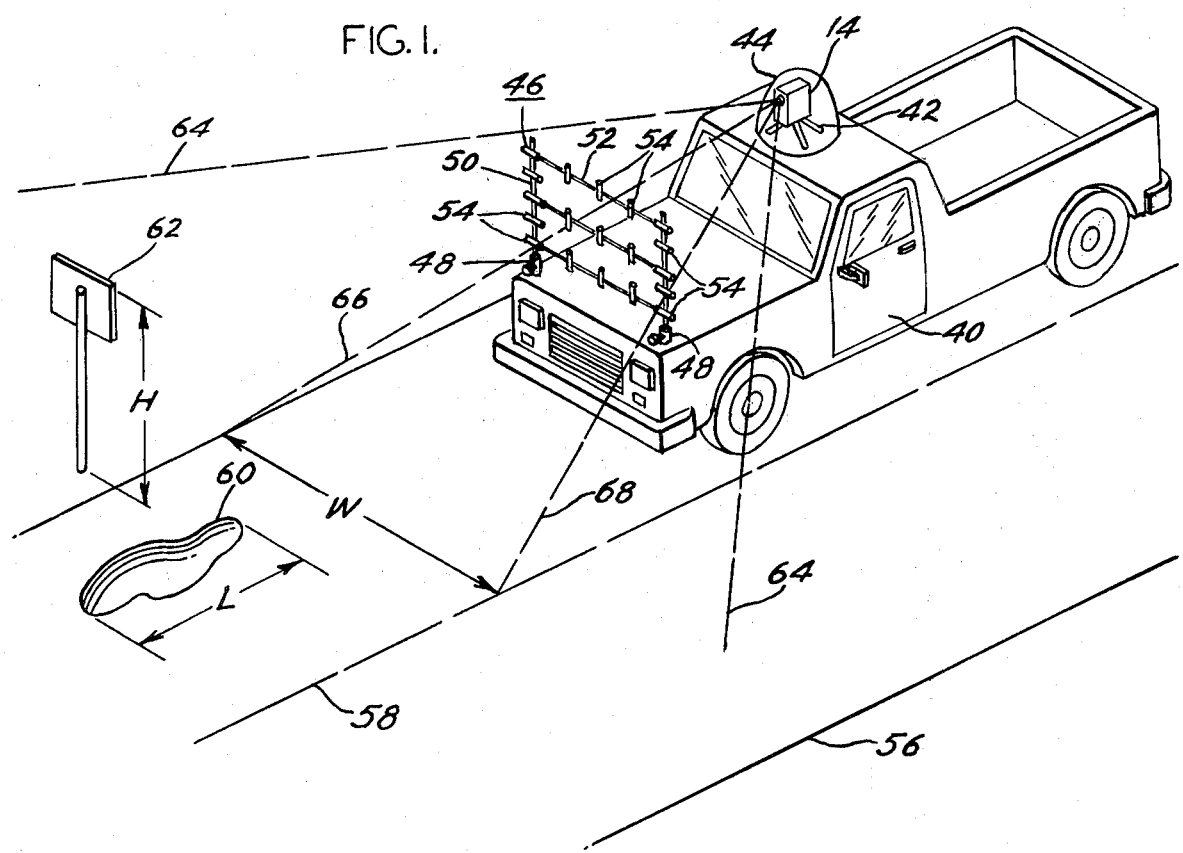
FIG. 2.
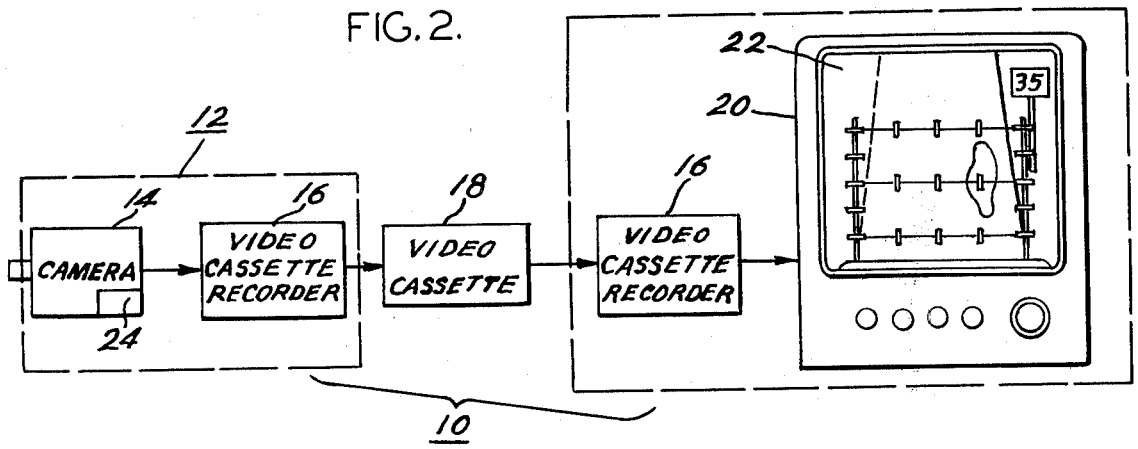
FIG. 3.
VIDEO CASSETTE
LOCATION:_____
TYP. ROAD WIDTH:_____
TYP. SIGN HEIGHT:_____
TYP. DISTANCE:_____
FIG. 4.
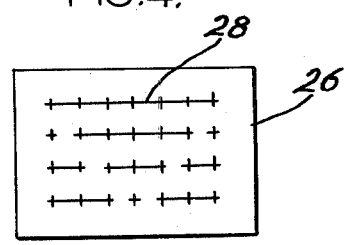

VIDEO SURVEYS

This is a continuation of application Ser. No. 031,559, filed Apr. 19, 1979, now abandoned.

BACKGROUND OF THE INVENTION

1. Field of the Invention

This invention relates generally to a method and apparatus for conducting surveys, of highways, bridges, mines, demolition sites, and the like, and in particular, relates to a method and apparatus for performing video surveys, wherein the surveyed locations are video recorded for subsequent review and analysis at a centralized control station.

2. Description of the Prior Art

Video scanning and/or recording has been utilized in other areas, such as policing horse races and security systems. Video systems have also been utilized in connection with road striping apparatus. One such apparatus known in the art utilizes an electronic sight, the monitor screen for which is located in front of the steering wheel of the paint vehicle. Another such apparatus comprises a television camera mounted on a vehicle adapted to travel on a paved surface such that the camera has a field of view encompassing the paved surface, and a receiver for producing an image of the field viewed by the camera. A scale is on the surface of the screen of the receiver, and by adjustment of the vehicle and the camera thereon, the image can be so located with respect to the scale to position the camera in a determined position. A road marking mechanism, such as for painting road lanes, can be mounted on the vehicle to mark the road surface at a specific location. Although the apparatus is referred to as a "surveying" apparatus, that term is specifically limited to measuring a paved surface for dividing the same into lanes or the like.

By way of contrast with the foregoing, this invention provides a method and apparatus for conducting nearly every type of survey, and is not limited to a partially automated apparatus for painting highway center lines. The method contemplates making a video recording of all locations to be surveyed. Where highway construction is contemplated, this would include video recording both the highway, if one exists already, as well as the buildings and flora on either side of the proposed construction. Special note may be taken of particular circumstances, such as culverts, streams, bridges or the like.

In the normal course of survey work today, a preliminary survey, as described above, must be conducted by one or more senior engineers, as well as one or more technicians. It may even be necessary to make several preliminary surveys. The method taught by this invention provides a means by which such preliminary surveys may be conducted by technicians alone, and in some circumstances, by even one technician. The video recorded survey may then be viewed and analyzed by any of the senior engineers at their central office location. This represents a substantial cost savings for all survey teams, particularly those run by the various state and local governments. In order that the engineer or other person viewing the survey may be aware of actual distances, an overlay having one or more scales may be prepared, which correlates the geometric disposition of the recording means, that is, a predetermined control position, with respect to the surveyed locations and the size of the monitor means. A more direct method for preparing a scale requires that during the course of the survey at least one actual measurement be taken of one feature being surveyed, for example, the average width of a highway. When the survey is replayed, the playback may be interrupted so that the width of the highway may be marked on an overlay covering the screen. Since this distance is known from one actual measurement, the scale on the overlay may be marked accordingly. Thereafter, when any measurement of a survey location is desired, the overlay may be shifted and the distance measured. In the alternative, it is possible to prepare a plurality of grid-like overlays, with standardized sets of scales and dimensions making it unnecessary to move the overlay about.

An integral scale means may be provided by an apparatus for conducting video surveys, comprising a motor vehicle, means for video recording locations to be surveyed, means for removably mounting the video recording means on the motor vehicle, and a set of members mounted on the vehicle and projecting into the field of view of the video recording means, thereby providing a video recorded survey with integral scale means. It would still be desirable to take at least one actual measurement.

By utilizing the methods and apparatus taught by this invention, it is a relatively simple matter to compile a complete tape library of an entire road system or subsystem thereof. The system is particularly useful for the surveys needed in pothole repair and other highway maintenance. File records of highway conditions may be updated periodically as new surveys are performed. A basis is provided for compiling accurate statistical records with respect to repairs and maintenance, with the special advantage of having records showing the highway or other structure both before and after some damage has occured or some period of time has passed.

SUMMARY OF THE INVENTION

It is an object of this invention to provide a method for conducting surveys.

It is another object of this invention to provide a method for conducting video surveys.

It is still another object of this invention to provide a method for conducting video surveys of highways, bridges, mines, demolition sites and the like.

It is a still further object of this invention to provide a method for conducting video surveys which eliminates the need for specially trained personel to take part in the actual survey.

It is yet another object of this invention to provide a method for conducting video surveys wherein scale factors may be easily correlated.

It is yet another object of this invention to provide an apparatus for conducting video surveys.

It is yet another object of this invention to provide an apparatus for conducting video surveys in combination with a motor vehicle or the like.

It is yet another object of this invention to provide an apparatus for conducting video surveys wherein scale factors are integral with the video recording.

These and other objects of this invention are accomplished by a method for surveying, comprising the steps of: video recording all locations to be surveyed from a predetermined control position, for subsequent playback on a monitor screen; preparing a transparent overlay having a scale correlating the predetermined control position of the video recording means with respect to the survey locations and the size of the screen; applying the overlay to the screen while playing back the video recording, utilizing the overlay to ascertain actual distances; and, annotating maps or the like with the actual distances, interrupting or replaying portions of the video recording as necessary. The method further contemplates the step of dictating and recording notes pertinent to the surveyed locations and circumstances of the survey, simultaneously with the video recording. The video survey may be conducted from a moving vehicle, such as a motor vehicle, airplane or helicopter, and may be made with a video cassette recording apparatus.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a perspective view of a video survey apparatus in combination with a motor vehicle in accordance with this invention;

FIG. 2 is a diagramatic representation of a video survey apparatus in accordance with this invention;

FIG. 3 is a diagramatic representation of a video cassette on which may be noted necessary scaling information; and, FIG. 4 is an overlay having multiple scales thereon.

DETAILED DESCRIPTION OF THE PREFERRED EMBODIMENTS

An apparatus for conducting video surveys according to this invention is illustrated diagramatically in FIG. 2, as a system 10 of components. The system comprises video recording means 12, including video camera 14 and video cassette recorder 16, video recording storage means 18, such as a video cassette and video playback or monitoring means 20, such as a television set, having a screen 22. The video recording means 12 may further comprise sound recording means 24, which facilitates recording notes pertinent to the surveyed locations and circumstances of the survey simultaneously with the video recording.

In order that an engineer or other person viewing in the survey may be aware of actual distances, an overlay 26 such as that shown in FIG. 4 may be prepared. The overlay 26 is provided with at least one, and preferably multiple distance scales 28. It is possible to mathematically compute scale values for the overlay based upon a predetermined control position of the video recording means, using geometric and trigonometric relationships, provided that such parameters as the height of the camera above ground level, the focal length of the camera lens and the field of view of the camera are known. This is a tedious process, even though the calculations may be performed on a computer or calculator. A simpler, more direct alternative requires that at least one actual measurement be taken of one feature of the surveyed location, during the course of the survey. This feature might be, for example, the average width of a highway. When the video recording is played back on the monitor screen 22, the playback may be frozen when a level stretch of straight road is displayed on the screen. The overlay 26 may then be placed over the screen, and adjusted until one of the multiple scales is matched to the width of the highway. At this point, a grease pencil or the like may be used to indicate which scale on the overlay agrees most closely with the actual measurement taken. Thereafter, whenever any actual measurements are desired, the playback may be frozen, and the chosen scale of the overlay selectively applied directly to the screen to ascertain the desired distance. It will be apparent that some distortion will occur when features such as curves and hill crests are encountered. However, it should be apparent to those skilled in the art that the results are more than sufficiently accurate for a preliminary survey, the principle purpose for which this invention is intended. The video cassette 18 may be provided with data storage means 30, on which may be noted the surveyed locations, data pertinent to the control position, and one or more actual distance measurements taken during the course of the survey.

Utilizing apparatus such as that illustrated in FIGS. 2, 3 and 4, a video survey may be conducted, comprising the steps of: video recording all locations to be surveyed from a predetermined control position, for subsequent playback on a monitor screen; preparing a transparent overlay having a scale correlating the predetermined control position of the video recording means with respect to the surveyed locations and the size of the screen; applying the overlay to the screen while playing back the video recording, utilizing the overlay to ascertain actual distances; and, annotating maps or the like with the actual distances, interupting or replaying portions of the video recording as necessary. In lieu of geometric calculations, the method further comprises the step of taking at least one physical measurement of the surveyed locations in order to prepare the scaled overlay. The method further contemplates the step of dictating and recording notes pertinent to the surveyed locations and circumstances of the survey, simultaneously with the video recording. The video survey may be conducted from a moving vehicle, such as a motor vehicle, airplane or helicopter. The method may be used for conducting video surveys of highways, bridges, demolition sites, mines and the like.

This invention also provides a means by which video recorded surveys may be provided with integral scale means. An apparatus for conducting such surveys with integral scale means is disclosed in FIG. 1, in conjunction with several typical road features. The apparatus comprises a motor vehicle 40, in this instance, a pickup truck. The motor vehicle 40 is provided with means for video recording locations to be surveyed, including a video camera 14 and means 42 for removably mounting the video recording means on the motor vehicle. In this instance, the video camera 14 is mounted in support means 42 which are disposed in a hole in the roof of the cab of the pickup truck. The video camera 14 and the hole in the roof of the cab may be covered by transparent plastic or glass dome 44, the video camera being removably inserted in the dome from within the cab. A set of projecting members 46 is disposed over the front fender or front bumper of the motor vehicle by removable mounting means 48. The projecting set of members 46 comprises two vertical members 50 and three horizontal members 52. Members 50 and 52 are provided with grid dividing members 54, which aid in establishing a grid-like array or multiple scale. The set of projecting members 46 is disposed so as to be completely within the field of view of the video camera 14.

The motor vehicle 40 is shown traveling along a typical two-lane highway 56, having divider line 58. In this arangement, the predetermined control position would be the center of the lane in which the vehicle is traveling, at a particular elevation. Two typical features found in and along a typical highway are also shown, a pothole 60 and a speed limit sign 62. The overall field of view of the camera is encompassed in the triangular sector enclosed by dotted lines 64. At some point, indicated by width W of one lane of the two-lane highway, the width of one of the horizontal members 52 of the grid 46 will appear to coincide with the width W of the lane as viewed by the video camera. This field of view is illustrated by the dotted lines 66 and 68. This is illustrated in the picture displayed and "frozen" on the screen 22 in FIG. 2. If an actual measurement were made of width W, then it is apparent from the picture on screen 22 that any distance between vertical members 46 along the lowermost horizontal member 52 will be approximately the measured distance W. The intermediate members 54 provide a scale for measuring smaller distances. A similar actual measurement may be made of the length L of the pothole 60. This distance may be correlated with the spaces between vertical indicators 54 as well as horizontal members 52. The same situation applies to an actual measurement of the height H of the sign 62. If the video cassette recorder is permitted to play forward from the view shown in FIG. 2, relative movement will take place between the grid 46 and the sign 62, although the grid will appear to stay in substantially the same position. At some point, the sign 62 would be fully within or substantially within the limits of the grid 46, and actual height measurements of features within the surveyed locations would also be possible. It will be appreciated by those skilled in the art that by making the three actual measurements indicated in FIG. 3, it will be possible to provide a video recorded survey, with integral scale means, which is capable of providing substantially accurate actual measurements of all surveyed features. In an alternative embodiment, a grid-like array of scales may be etched in or otherwise applied directly to the lens of the camera. As an alternative, distances may be determined by geometric correlation, provided that the dimensions of the grid members and their relative disposition with respect to the video camera, the control location, and surveyed location are known.

During the course of a survey, it often happens that peculiar or particular features are found, which would be of special interest or require special action. In such event, this invention contemplates interrupting the survey in order to make video recordings of the special features, such as culverts, bridges, particularly disposed buildings or trees and the like. If necessary, it is a relatively simple matter to remove the video camera 14 from its position within the dome 44, and to make closeup video recordings or video recordings from other angles and views.

As indicated, this invention also contemplates recording notes and comments regarding the surveyed locations and the making of the survey itself. These notes might include the general location, the average speed of the vehicle, and the description of any special features such as the culverts and bridges noted before. In the area of highway maintenance, it would be useful, for instance, to record an estimate of the depth of any potholes or any road obstructions encountered, since the dimensions of these particular features might be difficult to ascertain from the television screen.

The advantages of the methods and apparatus taught in this invention are numerous. Of principle importance are precision and economy. Common practice today dictates that one or more engineers and one or more technicians must be present for a preliminary highway survey. If an insufficient amount of information is obtained, then it is necessary for all of those persons to return to the surveyed area one or more times. By utilization of the methods and apparatus of this invention make it possible for preliminary surveys to be conducted as video surveys, performed even by only one technician, if necessary. Once the video recording has been made, it is then available for viewing as many times as is necessary by an entire engineering staff if desired. Over a period of months or years, it will be possible to compile an entire video recorded library of a highway system or subsystem thereof. This library may be periodically updated as new surveys are conducted, and can form the basis for analysing highway maintenance programs.

The methods and apparatus taught herein are also useful and adaptable for video surveys other than highway surveys. Aerial video surveys may be conducted from airplanes or helicopters using the basic techniques taught herein. A suitable set of projecting members 46 may be slung below the aircraft, within the field of view of the camera, or the camera lens itself may have scale means etched or otherwise applied thereto.

Surveys of demolition sites may also be conducted, providing the engineers with detailed pictures of a building's walls, foundation and other significant features. Cracks and other weaknesses could be recorded as necessary. As with other surveys described herein, the need for subsequent inspections can be reduced or entirely eliminated.

The present invention may be embodied in other specific forms without departing from the spirit or essential attributes thereof, and accordingly, reference should be made to the appended claims, rather then to the foregoing specification as indicating the scope of the invention.

I claim:

1. A method for surveying and measuring three-dimensional road and terrain features, comprising the steps of:

traveling along the road in a moving vehicle aligning a video camera to view along the direction of travel of the vehicle, the direction of travel defining a surveying axis and a field of view normal thereto;

continuously video recording two-dimensional images of the three-dimensional road and terrain features in the field of view with a video rcorder, said features being disposed at diverse distances from the camera and diverse angles from the surveying axis;

manually measuring and recording, during the course of the otherwise continuous video recording, the length, width and height of at least one road and terrain feature in the field of view;

playing back said recorded images of said road and terrain features, displaying said images on a screen;

superimposing a reference member having a plurality of scales, on said images of said manually mesured features;

calibrating said scales in accordance with said manual measurements;

and, directly determining the length, width and height of any of the remainder of said road and terrain features by comparing said images to at least one of said calibrated scales.

2. The method of claim 1, further comprising the step of calibrating said scales by correlating the apparent size of those recorded and displayed road and terrain features whose dimensions were manually measured.

3. The method of claim 1, wherein the reference member is superimposed on said images by placing a plurality of grid members on said vehicle, within said field of view, and directly recording images of said grid members together with said images of said road and terrain features.

4. The method of claim 1, wherein the reference member is a transparent reference overlay having the scales marked thereon, the reference overlay being superimposed by placement over said screen when said images are displayed thereon.

5. An apparatus for surveying and measuring three-dimensional road and terrain features visible from a moving vehicle, said apparatus comprising:
 a video recorder, including a camera having an optical axis defining a surveying axis substantially aligned with the direction of movement of the vehicle and having a field of view normal to the optical axis, encompassing the road and terrain features, for continuously recording two-dimensional images of the three-dimensional road and terrain features;
 video playback apparatus for displaying said images on a screen; and,
 a reference member having a plurality of scales superimposed on said images, whereby the length, width and height of said recorded features may be directly determined by a comparison of said images and at least one of said scales.

6. The apparatus of claim 5, wherein the scales have been calibrated by a correlation with at least one manual measurement of the length, width and height of at least one recorded road and terrain feature.

7. The apparatus of claims 5 or 6, wherein said scales comprises two sets of equi-distant, parallel markings, the sets being mutually perpendicular.

8. The apparatus of claim 5, wherein said scales comprise a plurality of grid members mounted on said vehicle within said field of view, images of said grid members being directly recorded together with said images of said road and terrain features.

9. The apparatus of claim 5, wherein said scales comprise a transparent overlay bearing said markings, which can be selectively positioned on said screen in accordance with the images displayed thereon.

10. The apparatus of claim 5, further comprising audio recording means for simultaneously recording notes pertinent to said recorded images of said road and terrain features.

* * * * *